Sept. 27, 1932.  E. H. HICKOK  1,880,136

SEED HOLDER

Filed Oct. 10, 1930

E. H. Hickok
INVENTOR

BY Victor J. Evans
ATTORNEY

Patented Sept. 27, 1932

1,880,136

UNITED STATES PATENT OFFICE

EUGENE H. HICKOK, OF LE ROY, MINNESOTA

SEED HOLDER

Application filed October 10, 1930. Serial No. 487,842.

This invention relates to the art of growing plants and has for an object the provision of a seed holder within which the seed may be placed in proper position for rapid germination and growth, the position of the seed acting to direct the growth directly upward, so that the invention may be advantageously used with mulch paper, as the plant will be directed upward through the opening in the paper.

Another object of the invention is the provision of a seed holder which will plant the seed at its proper depth, and which is composed of materials that will disintegrate and provide food for the plant after germination.

Another object of the invention is the provision of a seed holder, by means of which some varieties of seed may be planted with good results through the small openings in mulch paper, the side walls of the holder being sufficiently rigid to direct the plants upward through said openings.

Another object of the invention is the provision of a holder which may be also used for plants grown in shelter and later either by hand or machinery.

With the above and other objects in view, the invention further includes the following novel features and details of construction, to be hereinafter more fully described, illustrated in the accompanying drawing and pointed out in the appended claims.

In the drawing:—

Figure 1:
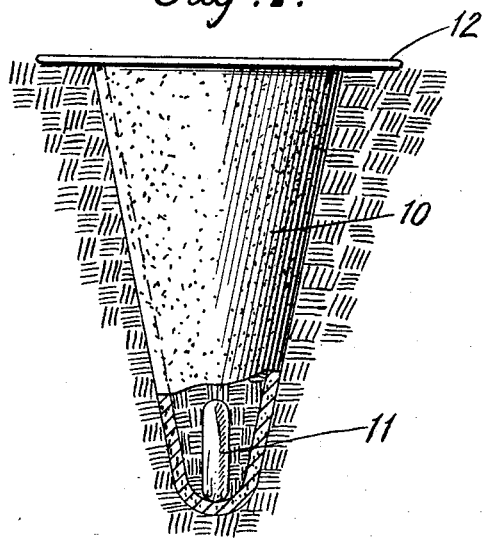
Figure 1 is an elevation partly in section illustrating one form of the invention.
Figure 2:
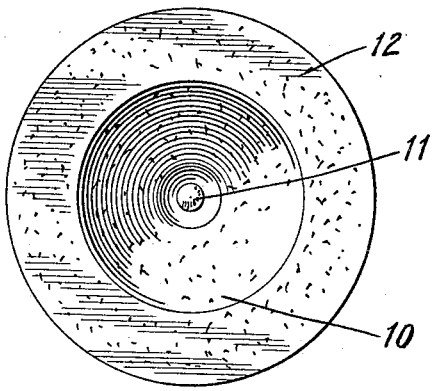
Figure 2 is a plan view of the same.

Referring to the drawing in detail wherein like characters of reference denote corresponding parts, the reference character 10 indicates a receptacle which as shown in Figure 1, is in the form of an inverted cone. The walls of the receptacle are of a thickness to be sufficiently rigid to maintain the seed 11 in proper position for rapid germination and proper growth. The upper open end of the receptacle is surrounded by an outwardly extending flat annular flange 12 which limits the depth of insertion of the holder into the ground in an inverted position. The holders are made of different lengths for different varieties of seed, so that each particular variety of seed will be planted at the proper depth to insure rapid germination and growth. In addition, the holders are made of a mixture of organic and inorganic material, the character of the material depending upon the particular type of seed with which the holder is used. Thus, the holder will disintegrate and provide food for the plant after the seed germinates.

Figure 3:
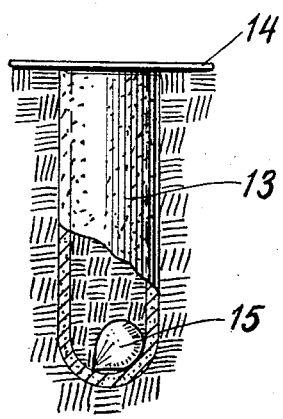
Figure 3 is a view similar to Figure 1 showing a slightly different form of the invention.
Figure 4:
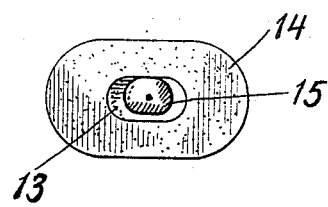
Figure 4 is a plan view of the invention shown in Figure 3.

The holder shown in Figures 3 and 4 and indicated at 13 is of elongated formation and provided with parallel walls and may be cross sectionally circular, or may be flattened as shown in Figure 4 of the drawing. This holder is provided with a flat depth flange 14 so that the seed 15 with which it is used will be planted at a proper depth. It will, of course, be understood that the depth flange 14 engages with the earth or ground upon the insertion of the receptacle therein in an inverted position.

It will be apparent from the foregoing description and accompanying drawing that through the use of the holder, seed may be planted at the correct depth to insure proper and rapid germination and plant growth. It may be composed of a material which will be partially or totally disintegrated and form proper plant food necessary for a particular variety of plant. For some plants it may be so composed as to carry a trace of poison to destroy pests and thus protect the seed and plant against worms and insects.

By means of the holder it is possible and practical to plant the seed with good results through the small openings in mulch paper, the side walls of the holder being sufficiently rigid to direct the growth upward through the openings.

Decomposition of the holder may be hastened by spraying the holder with a weak acid solution either on the bottom or throughout the walls of the holder. Further, the holder may be used for plants grown in shelter and later reset, the holder being formed of a material which will maintain the walls rigid while the plant is being started, after which the holder and plant may be transplanted either with or without the use of machinery.

The invention is susceptible of various changes in its form, proportions and minor details of construction and the right is herein reserved to make such changes as properly fall within the scope of the appended claims.

Having described the invention what is claimed is:—

1. A seed holder comprising an elongated receptacle open at one end, and a flat flange extending outward around the open end of the receptacle.

2. A seed holder comprising a receptacle having an open end formed of a disintegrating material for accommodating different varieties of seed and having stiff walls shaped to maintain seeds on the bottom of the receptacle in an upward position, and an outwardly extending flat flange formed around the open end of the receptacle for limiting the depth of insertion of the receptacle into the ground in an inverted position.

3. A seed holder formed of a disintegrating material comprising a receptacle open at one end and closed at its opposite end, the walls of the receptacle being sufficiently rigid to maintain the seed in proper position for rapid germination and growth, and a flat flange extending outwardly around the open end of the receptacle.

In testimony whereof I affix my signature.

EUGENE H. HICKOK.